US012688433B2

(12) United States Patent (10) Patent No.: US 12,688,433 B2
Nambiar et al. (45) Date of Patent: Jul. 21, 2026

(54) AUTO TUNED SWARM LEARNING MODELS

(71) Applicant: HEWLETT PACKARD ENTERPRISE DEVELOPMENT LP, Spring, TX (US)

(72) Inventors: Divya C. Nambiar, Bangalore (IN); Madhusoodhana Chari Sesha, Bangalore (IN); Hemant Jain, Bangalore (IN); Vikrant Mah Dhimate, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 574 days.

(21) Appl. No.: 18/347,072

(22) Filed: Jul. 5, 2023

(65) Prior Publication Data

US 2025/0013872 A1 Jan. 9, 2025

(51) Int. Cl.
G06N 3/098 (2023.01)

(52) U.S. Cl.
CPC .................................... G06N 3/098 (2023.01)

(58) Field of Classification Search
CPC ...................................................... G06N 3/098
USPC .......................................................... 706/18
See application file for complete search history.

(56) References Cited

U.S. PATENT DOCUMENTS

| | | | | |
|---|---|---|---|---|
| 10,970,402 | B2 | 4/2021 | Verma et al. | |
| 2018/0285759 | A1* | 10/2018 | Wood ..................... | G06N 3/006 |
| 2021/0209483 | A1* | 7/2021 | Bose ...................... | G06N 5/025 |
| 2021/0233099 | A1* | 7/2021 | Manamohan ........... | G06Q 10/10 |
| 2021/0234668 | A1* | 7/2021 | Manamohan ......... | H04L 9/3239 |
| 2021/0241183 | A1 | 8/2021 | Garg et al. | |
| 2021/0398017 | A1 | 12/2021 | Garg et al. | |
| 2022/0108186 | A1 | 4/2022 | Duarte | |
| 2022/0256431 | A1 | 8/2022 | Liu et al. | |

FOREIGN PATENT DOCUMENTS

WO 2019/245167 A1 12/2019

OTHER PUBLICATIONS

Angela, Swarm Learning: Turn your distributed data into competitive edge, 2019 (Year: 2019).*
HPE, "Swarm Learning: Turn Your Distributed Data Into Competitive Edge", 2019, 11 pages.
Jason Brownlee, "How to Grid Search Hyperparameters for Deep Learning Models in Python with Keras", Aug. 4, 2022, 127 pages.
Khodak et al., "Weight-Sharing for Hyperparameter Optimization in Federated Learning", 2020, 9 pages.
Mittal et al., "Hyperparameter Optimization Using Sustainable Proof of Work in Blockchain", May 2020, 13 pages.

* cited by examiner

*Primary Examiner* — Tarek Elchanti
(74) *Attorney, Agent, or Firm* — Hewlett Packard Enterprise Patent Department

(57) ABSTRACT

Swarm learning systems and methods can perform hyperparameter tuning. Network nodes train a common machine learning (ML) algorithm using data local to each of the network nodes. Hyperparameter optimization is also performed at each of the network nodes. Model parameters and optimized hyperparameters are shared by the network nodes, and are subsequently merged. An updated version of the common ML algorithm based on the merged model parameters and the merged optimized hyperparameters is generated. That updated version of the common ML algorithm is re-trained at each of the network nodes.

10 Claims, 7 Drawing Sheets

100

HTTPS MICRO SERVER 31

BLOCKCHAIN INTERFACE LAYER 30

BLOCKCHAIN API 32

SMART CONTRACT(S) 44

TRANSACTIONS 34

42

STATE 38

CONSENSUS ENGINE 36

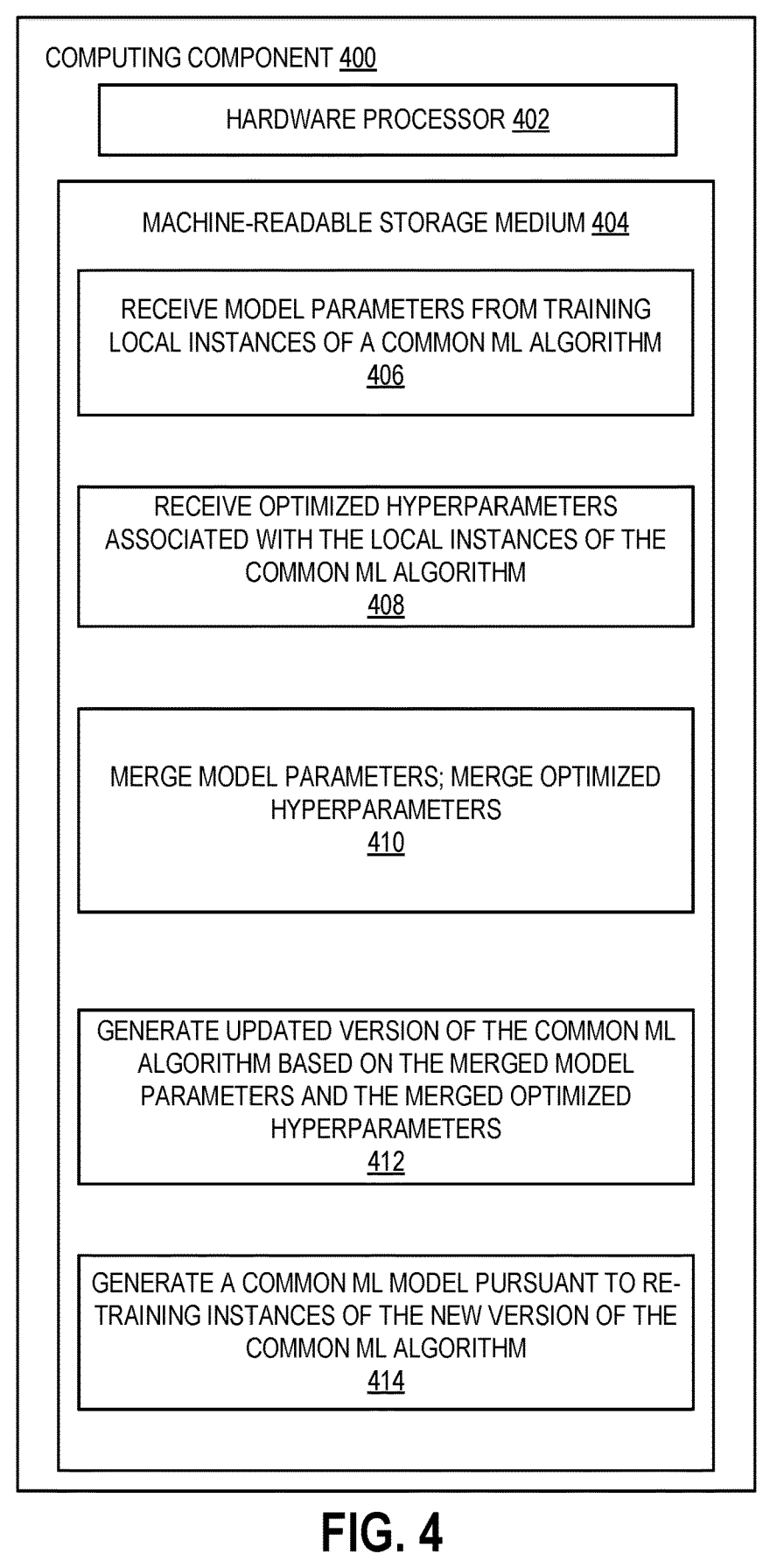

COMPUTING COMPONENT 400

HARDWARE PROCESSOR 402

MACHINE-READABLE STORAGE MEDIUM 404

RECEIVE MODEL PARAMETERS FROM TRAINING LOCAL INSTANCES OF A COMMON ML ALGORITHM
406

RECEIVE OPTIMIZED HYPERPARAMETERS ASSOCIATED WITH THE LOCAL INSTANCES OF THE COMMON ML ALGORITHM
408

MERGE MODEL PARAMETERS; MERGE OPTIMIZED HYPERPARAMETERS
410

GENERATE UPDATED VERSION OF THE COMMON ML ALGORITHM BASED ON THE MERGED MODEL PARAMETERS AND THE MERGED OPTIMIZED HYPERPARAMETERS
412

GENERATE A COMMON ML MODEL PURSUANT TO RE-TRAINING INSTANCES OF THE NEW VERSION OF THE COMMON ML ALGORITHM
414

FIG. 4

AUTO TUNED SWARM LEARNING MODELS

DESCRIPTION OF THE RELATED ART

Geo-distributed, decentralized enterprise infrastructures or systems such as factory floors, clusters of geographically distributed servers, fleets of autonomous vehicles, Internet of Things (IoT) networks, are typically managed infrastructures/systems. Aside from being decentralized, these systems can be massive in scale, and heterogeneous in nature.

Machine learning (ML) can refer to a method of data analysis in which the building of an analytical model is automated. ML is commonly considered to be a branch of artificial intelligence (AI), where systems are configured and allowed to learn from gathered data. Such systems can identify patterns and/or make decisions with little to no human intervention.

BRIEF DESCRIPTION OF THE DRAWINGS

The technology disclosed herein, in accordance with one or more examples, is described in detail with reference to the following figures. The drawings are provided for purposes of illustration only and merely depict typical or example examples of the disclosed technology. These drawings are provided to facilitate the reader's understanding of the disclosed technology and shall not be considered limiting of the breadth, scope, or applicability thereof.

FIG. 4 is an example computing component that may be used to implement auto tuned hyperparameter tuning in swarm learning in accordance with one example of the disclosed technology.

Figure 1A:
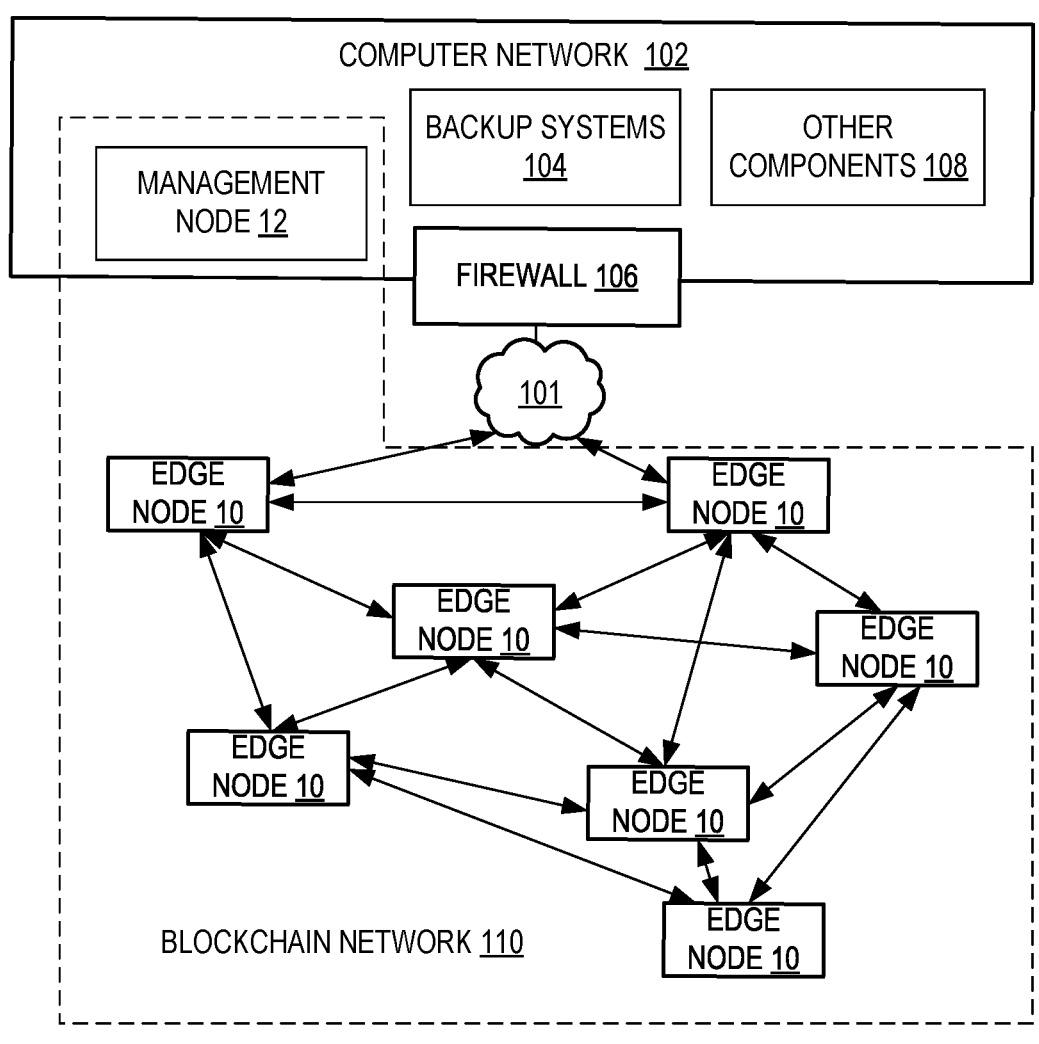
FIG. 1A illustrates an example of a system of decentralized management of device assets outside a computer network in accordance with an example of the disclosed technology.

The figures are not intended to be exhaustive or to limit examples to the precise form disclosed. It should be understood that the invention can be practiced with modification and alteration, and that the disclosed technology be limited only by the claims and the equivalents thereof.

DETAILED DESCRIPTION

Robust ML models are achieved by training an ML algorithm using, typically, large amounts of data, making data a valuable asset. Distributed ML can refer to ML model building across multiple nodes using data locally available to or at each of the nodes, making distributed ML a natural and convenient mechanism for obtaining such large amounts of data. In distributed ML, local ML parameters (also referred to as weights) learned during training of each local algorithm can be merged to derive a global/common algorithm, where the resulting global algorithm can be redistributed to the nodes for another iteration, i.e., localized data trains the global/common algorithm. This can be repeated until the desired level of accuracy with the global/common algorithm is achieved, the result being a global/common model.

It should be understood that as used herein, the term "algorithm" in the ML context, can refer to a procedure (what one may think of as an algorithm in the computer science realm) that is run on data (training data) to create a "model," which can refer to the output of the algorithm after being run/trained on data. ML algorithms may perform pattern recognition, such that algorithms "learn" from data or are "fit" to a dataset. An ML model represents what was learned by the corresponding ML algorithm, in other words, the ML model is what is saved after running an algorithm on training data. Such an ML Model represents the rules, numbers, or any other algorithm-driven data structures needed to generate predictions. An ML model can be thought of as a program in the computer science sense comprising data and some procedure(s) for using data to make a prediction.

It should also be understood that weights in the context of ML can refer to learnable/fitted parameters of an ML model, otherwise referred to as model parameters. Typically, in ML, weights are multiplied with relevant inputs/features to obtain some prediction, e.g., to predict the value of y as a function of $x1$ and $x2$ inputs with a linear model, $x1$ and $x2$ may each be multiplied with a particular weight. That particular weight can be a real value associated with the input/feature, and that conveys the importance of that corresponding feature in predicting an output. More generally, an ML model's parameters are variables that a given ML technique uses to adjust data. In many ways, these model parameters can be considered to be the ML model-they distinguish a particular model from other models of the same kind or type that work on similar data. Similarly, biases are another learnable parameter that are typically constant, and are used for shifting an activation function (left or right). In contrast, hyperparameters are parameters that define how an ML model/algorithm is actually structured. That is, hyperparameters can be thought of as a mechanism for governing the training process, e.g., deciding how many hidden layers of nodes to use, or how many training iterations or epochs should be performed, and so on. Hyperparameters are adjustable parameters that can be tuned to obtain/generate an ML model/algorithm with optimal/tuned performance.

Distributed ML realizes advantages in terms of security and privacy (distributed ML systems typically utilize a blockchain as a backend distributed ledger and local training data need not be made known/shared with other nodes), but any resulting global/common ML model tends to suffer in accuracy. That is, typical distributed ML systems or platforms mandate that nodes or edges should use the same common ML algorithm during training. Because nodes will not be aware of other nodes' local data, a common ML model is less likely to provide accurate predictions because the nodes are trained with heterogeneous/non-common data.

Swarm learning can refer to a particular type of decentralized ML where computing power is implemented or provide at/near the distributed data sources with the security of a blockchain or other secure ledger-type technology (ies). In swarm learning, as alluded to above, both training of an ML algorithm, and inferencing with the trained model occur at the network edge, where data is most "fresh," and prompt data-driven decisions are most desirable. In its completely decentralized architecture, learned insights (e.g., model parameters) instead of the raw (local) data are shared among collaborating ML peers, which tremendously enhances data security and privacy.

As noted above, systems, infrastructures, and networks can be decentralized, and can also be massive in scale, and heterogeneous in nature, making management difficult. It can be appreciated that managing such systems may present logistic challenges that are compounded when these infrastructures have or interact with devices (nodes) that operate outside of an enterprise network, e.g., are owned by another one or more users or entities.

Accordingly, systems and methods are provided that integrate an optimization phase into the distributed ML/swarm learning process to realize an auto tuned swarm learning ML models. In particular, hyperparameter optimization or tuning can be performed at the local nodes during the training phase. As alluded to above, in a distributed ML system, each node engages in the training of a local version or instance of a global or common ML algorithm. During such training, local model parameters/weights can be determined, and subsequently shared with other nodes. A leader node can receive the local model parameters, merge the local model parameters, and distribute the merged local model parameters back to the nodes.

At this point, hyperparameter optimization or tuning can be performed. It should be understood that hyperparameter tuning works by executing or running multiple trials or iterations (epochs) in a training job. Each epoch or iteration comprises training the ML algorithm with particular values chosen for the relevant hyperparameters, set within certain specified limits. Following the epoch example, the number of epochs to be executed is the hyperparameter being tuned. If a first node shares that its optimum number of epochs is, e.g., ten, while a second node shares that its optimum number of epochs is, e.g., twenty, the leader node may return the merged epoch value, which for example, can be the value twenty, to each of the nodes. Merging of hyperparameters in this context can refer to determining a mean, median, or maximum value associated with the hyperparameters. Each of the nodes may then undergo additional training in accordance with the epoch value, i.e., the nodes will run twenty training epochs, the results (model parameters) of which can again be merged (by the leader node), ultimately resulting in a global or common ML model that not only reflects the benefit of localized training, but that also utilizes the optimum hyperparameters, i.e., the most effective configuration of values, across the nodes.

As noted above, ML can refer to the use of computer systems that are configured and allowed to learn from gathered data. It should be understood that although some AI/ML systems and methods may be meant to emulate or may be modeled after aspects of the human mind, such as neural networks, AI/ML systems and methods cannot be realized by, nor performed by the human mind. ML is implemented or executed in/on computers, processors, and is reliant on computer memory, and as is the case with examples described herein, involve the transmission and gathering of data between various computerized/processing entities, such as network nodes. Moreover, it will be appreciated that the human mind would not be capable of handling the nature of computing/processing/storing/other operations or functionality disclosed herein, such as speed, amount/complexity of processing, etc., e.g., of the aforementioned massively scaled, and heterogeneous systems and infrastructures.

As noted above, examples of the technology disclosed herein, referred to as swarm learning, build on distributed ML and, e.g., blockchain technology. It should be noted that while examples of the disclosed technology herein are described as leveraging blockchain technology, use of blockchains is not integral to the disclosed technology. Other distributed ledger technology or other backend/backbone technologies may be used. Distributed ML, as alluded to above, can be leveraged for its ability to train a common ML algorithm across multiple nodes (global or common ML algorithm) using data (or a subset(s) of data) at each node of the network. The blockchain aspect allows for decentralized control and scalability, while also providing the requisite fault-tolerance to enable examples of the disclosed technology to work beyond the single enterprise/entity context.

The blockchain framework will be described first. A controller framework can be provided that allows participant nodes in a network to interact with each other using blockchain technology. The use of blockchain technology for these interactions may be implemented to ensure that the interactions are secured, non-repudiated, sequenced and permissioned. Examples may also be implemented to use a blockchain to allow participants to evolve a consensus protocol for one or more aspects of the distributed ML portion of the swarm learning framework. For example, consensus protocols can be agreed by participants (nodes) and implemented as smart contracts in the system using blockchain technology.

In another example, operations may be implemented to provide provenance tracking across a heterogeneous distributed storage platform to track which nodes conducted which operations on which systems. In some applications, metadata operations may be routed via a blockchain and storage devices or other network entities can be configured to accept operations only via the blockchain interface. For example, storage devices on the network can be commanded to allow metadata operations via the blockchain interface. In this way, factors such as identity, authorization, provenance, non-repudiation and security can be provided for operations on nodes managed in this way.

Accordingly, examples may be implemented in which the management operation becomes decentralized and the system no longer requires a central entity to enforce policies. Particularly, in some applications, the system may be implemented with no central management server, and may instead use only a management node or nodes to input management instructions onto the blockchain using blockchain transactions. Once a change is approved, a device may implement the change and the blockchain can be used to provide a clear record of state of the system as it evolves over time. Because examples may be implemented in a peer-to-peer environment without a central management entity, the enterprise is scalable without limitations on how many nodes a central management entity might be able to address.

Decentralized management of assets operating outside a computer network (also referred to as edge nodes) from within the computer network may be achieved. The edge nodes may include enterprise devices and the computer network may include the enterprise's network. Network traffic to and from the computer network may pass through a firewall around the computer network. A management server (also referred to as a management node) may operate within the firewall to manage the configuration of edge nodes operating outside the firewall using blockchain technology. The management node and the edge nodes may be part of a blockchain network.

The management node may act as a full node that stores a complete or at least updated copy of a distributed ledger. The management node may also act as a miner that has permission to write blocks to the distributed ledger. The management node may mine management operations in the form of change requests into the distributed ledger. The management operations may include, without limitation, removal of an edge node from the network (such as resulting from non-compliance of the edge node to set protocols followed by the network). Management operations may also include the addition of a new asset (edge node) into the network and configuring of that new asset, as well as proposal of a new software update that will be installed on edge nodes. Further still, management operations can include the execution of a status check on some or of the edge nodes, and/or other operations that can be remotely ordered and applied locally at an edge node.

Updates to the distributed ledger are propagated to the nodes (such as the edge nodes and the management node) according to a blockchain specification, including via peer-to-peer sharing. This permits the management node to communicate change requests to edge nodes through the distributed ledger in a secure and immutable way. This also permits generation of a historic and current record of the management operations. As such, a historic and current state of the system may be stored and retrieved from the distributed ledger.

Each of the edge nodes may act as a full node that stores a complete or at least updated copy of the distributed ledger. In some instances, none of the edge nodes have permission to write to the distributed ledger and therefore cannot issue change requests to other edge nodes. An edge node may read its local copy of the distributed ledger to obtain the change requests. Upon receipt of a change request, the edge node may implement the change request and update its state to indicate the change request has been implemented. This state transition may be broadcast to other nodes, such as in the form of a blockchain transaction. The management node may collect transactions not yet written to the distributed ledger and write them to the distributed ledger, thereby ensuring an immutable and distributed record of change requests and state transitions. As such, the distributed ledger may record the current and historic configuration of the edge nodes.

Use of the foregoing architecture ensures management operations are secured, non-repudiated, sequenced, and permissioned. Management operations become partially "decentralized"; as a data center within a computer network serves as a management node that enforces policies and electronically proposes changes. Once a change is mined into the distributed ledger, each of the systems implement the change and there is a clear record and undisputable record of state of the system as it progressed and evolved over time. For example, an edge node can synchronize its copy of the distributed ledger from other edge nodes (or from the management node) to obtain the current, valid, and immutable configuration of the system. The foregoing permits system scaling, as any participant of the system may access current (and historic) state information from the distributed ledger. New edge nodes may be added by providing the new node with a copy of the distributed ledger. A new edge node may then configure itself according to the current state information from its copy of the distributed ledger or otherwise obtain software or other updates consistent with the current state information.

FIG. 1A illustrates an example of a system 100 of decentralized management of device assets outside a computer network 102, according to an implementation of the invention. System 100 may include a blockchain network 110. The blockchain network 110 may include a plurality of nodes that are connected to one another using one or more connection protocols, including a peer-to-peer connection protocol. The nodes of the blockchain network 110 may include a management node 12 and edge nodes 10. The particular number of, configuration of, and connections between the edge nodes 10 may vary. As such, the arrangement of the edge nodes 10 shown in FIG. 1A is for illustrative purposes only.

The management node 12 is part of and operates within a firewall 106 of computer network 102 and the edge nodes 10 operate outside the firewall. As alluded to above, and as will be described in greater detail below, such edge nodes 10 may contribute data that can be used to train a local instance of a global ML model in a swarm learning context. The computer network 102 may also include one or more backup systems 104 that provides failover protection for the management node 12 and/or other components 108 operating within the computer network. The components of the computer network 102 may communicate with one another via a local area network ("LAN"). The components of the computer network 102 may communicate with devices outside the computer network 102 through the firewall 106. The firewall 106 may be configured as a software firewall and/or a hardware firewall device. The firewall 106 may include or connect with a network switch device that routes network traffic into and out of the computer network via the firewall. The network 101 may include a wide area network ("WAN") that connects devices outside the firewall 106.

Examples of further details of a management node 12 will now be described with reference to FIG. 1B. The management node 12 may include one or more processors 20 (also interchangeably referred to herein as processors 20, processor(s) 20, or processor 20 for convenience), one or more storage devices 40, and/or other components. The processor 20 may be programmed by one or more computer program instructions. For example, the processor 20 may be programmed to execute a management user interface 22 (illustrated as "management user interface 22"), a controller 24, a blockchain interface layer 30, and/or other instructions to perform various operations, each of which are described in greater detail herein. As used herein, for convenience, the various instructions will be described as performing an operation, when, in fact, the various instructions program the processors 20 (and therefore management node 12) to perform the operation.

The management user interface 22 may provide an interface, such as a graphical user interface, a command line interface, and/or other type of interface configured to receive management option inputs. For instance, a user such as a system administrator may use the management user interface 22 to input management operations to be conducted on one or more of the edge nodes 10 of the blockchain network 110, or to input an edge node to be added. In this manner, the user may manage edge nodes 10 based on change requests originating from within the computer network 102.

The controller 24 may obtain management operations to be performed and may communicate them to the relevant edge nodes 10. The management operations may be obtained from the management user interface 22 and/or a global policy 48. Controller 24 may communicate the management operations using the blockchain interface layer 30. For example, the controller 24 may write the management operations into a blockchain transaction that is broadcast to the edge nodes 10. The blockchain transaction may be broadcast using a multicast protocol to several or all edge nodes 10. In some instances, the blockchain transaction may be broadcast using peer-to-peer networking in which the management node 12 acts as a peer to broadcast the transaction to at least one other peer (in this case, an edge node 10), which broadcasts the transaction to other peers and so on. In some implementations, the controller 24 may wait until a blockchain transaction is signed by an edge node 10 as described herein before writing the transaction to a block (also referred to herein as a "ledger block") of the distributed ledger 42. In these implementations, the edge nodes 10 may obtain management operations directly from the broadcasted transaction. In other implementations, the controller 24 may write the transaction to a block of the distributed ledger 42. In these implementations, the edge nodes 10 may obtain management operations by obtaining the current (in other words latest) block that references transactions having management operations.

In whichever manner the controller 24 broadcasts the management operations to edge nodes 10 using the blockchain interface layer 30, the controller may do so to in a manner that is directed all edge nodes 10. For example, a management operation of "check status" may be directed to all nodes of the blockchain network 110 so that each edge node is instructed to perform a status check. Each edge node 10 will then perform the status check and broadcast its state indicating the results of the status check (or other management operation as described below).

In some instances, the controller 24 may target one or more edge nodes 10 to receive a management operation. In these implementations, the controller 24 may generate a blockchain transaction and/or a block on the distributed ledger 42 directed to the targeted edge node(s) 10. For instance, the controller 24 may encode an identifier of the edge node 10 that is targeted. Alternatively or additionally, the controller 24 may encode a device type that targets certain types of edge nodes 10 that should perform management operations. Still other examples include locations that should be targeted such that edge nodes in certain geolocations are targeted. The smart contracts 44 may include rules, which each edge node 10 follows, that direct the nodes to inspect transactions and/or blocks to determine whether it should apply a management operation contained in the transaction and/or block. In some implementations, the controller 24 may encrypt the management operation to be performed with a target edge node's 10 public key such that only the target edge node can decrypt the management operation with its private key.

In some instances, certain management operations may be executed periodically without user intervention. For example, controller 24 may execute a daemon or other process that periodically causes a status check from edges nodes 10 to be executed. This daemon may periodically generate relevant change requests, which are issued to the edge nodes 10—and tracked via—the distributed ledger 42.

In an implementation, the controller 24 may enforce global policy 48 by ensuring that the state of the network complies with the global policy. For instance, the controller 24 may periodically obtain the current system state from the distributed ledger 42. As noted elsewhere, state transitions of the edge nodes 10 may be recorded on the distributed ledger 42. Alternatively or additionally, the result of status checks may be written to the distributed ledger 42, indicating the current state of the system. The controller 24 may compare the current system state (such as state of the blockchain network 110) with the global policy 48, which may specify a desired state of the system. The desired state may include a macro state of the system as a whole and/or a micro-state of any individual or group of edge nodes. Any discrepancies may be noted and an edge node 10 in non-compliance may be targeted for executing a management operation that will resolve the non-compliance. In some instances, the smart contracts 44 and/or global policy 48 may encode rules that specify when a non-complying edge node 10 should be taken offline. For instance, the rules may specify an edge node 10 that continues to be in non-compliance after N number of blocks have been written to the distributed ledger 42 should be taken offline. Other parameters may specify such removal as well. The foregoing may ensure recurring policy enforcement and compliance using the blockchain interface layer 30.

In one example, in connection with certain types of management operations, the controller 24 may make available files for download. For instance, operating system images, software updates, new software, and/or other downloadable files or data may be made available for edge nodes 10 to download in connection with a management operation. As will be described below, in some examples, downloadable files may include files containing particular encryption keys, merged parameters, etc. This may ensure that the distributed ledger 42 itself does not have to store such files or data but stores an immutable record of current files or data that should be used (as well as historic listing of such files or data).

The blockchain interface layer 30 may be used to interface with the distributed ledger 42 in accordance with the smart contracts 44. The blockchain interface layer 30 is described with reference to FIG. 1D below.

The storage devices 40 may store a distributed ledger 42, smart contracts 44, node keys 46, and/or other data. The distributed ledger 42 may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. The distributed ledger 42 may store blocks that indicate a state of an edge node 10 relating to its configuration or other management information.

The smart contracts 44 may include rules that configure nodes to behave in certain ways in relation to decentralized management of edge nodes. For example, the rules may specify deterministic state transitions, which nodes may enroll to participate in decentralized management, rules for implementing a change request issued by the management node 12, and/or other actions that an edge node 10 or management node 12 may take for decentralized management. In some examples, such rules may specify when rewards can be distributed, how many peers comprise a quorum, coordination of verification amongst peer nodes, etc.

The node keys 46 may store public encryption keys of edge nodes 10 in association with their identities (such as Internet Protocol or other addresses and/or identifying information). In this manner, in some implementations, change requests may be targeted to specific edge nodes 10 and encrypted using the target edge node's public key.

The global policy 48 may store a security or other policy for the system. The global policy 48 may include, for example, network configuration settings, security configuration settings, operating system settings, application settings, policy rules, and/or other policy information for devices managed by the management node 12.

Examples of further details of an edge node 10 will now be described with reference to FIG. 1C. An edge node 10 may be a fixed or mobile device. While only one of the edge nodes 10 is illustrated in detail in the figures, each of the edge nodes 10 may be configured in the manner illustrated. The edges nodes 10 may communicate with one another in a peer-to-peer manner. The edge nodes 10 may each include one or more processors 50 (also interchangeably referred to herein as processors 50, processor(s) 50, or processor 50 for convenience), one or more storage devices 70, and/or other components.

The processor 50 may be programmed by one or more computer program instructions. For example, the processor 50 may be programmed to execute a blockchain agent 52, a configuration manager 54, a blockchain interface layer 30, and/or other instructions to perform various operations, each of which are described in greater detail herein. As used herein, for convenience, the various instructions will be described as performing an operation, when, in fact, the various instructions program the processors 50 (and therefore edge node 10) to perform the operation.

The blockchain agent 52 may use the blockchain interface layer 30 to communicate with other edge nodes 10 and/or management node 12. The blockchain interface layer 30, described with reference to FIG. 4, may operate in the same manner at management node 12 and edge node 10 to communicate with the blockchain network (other than being able to write to the distributed ledger 42). For example, the blockchain agent 52 may obtain an updated copy of the distributed ledger 42 from one or more other edge nodes 10 and/or management node 12. The blockchain agent 52 may also obtain management operations from the distributed ledger 42 written by the management node 12. In this manner, the management node 12 may communicate management operations to be performed at an edge node 10 through the distributed ledger 42.

The configuration manager 54 may obtain one or more management operations from the blockchain agent 52. The configuration manager 54 may apply the one or more management operations to the edge node 10. In some instances, the configuration manager 54 may apply the management operations without a determination of whether to do so. In other instances, the configuration manager 54 may consult one or more local policies to ensure that the edge node 10 can comply with the one or more management operations. The local policies may be encoded by the smart contracts 44. Alternatively or additionally, some local policies may be stored in a local policy 78, which is not necessarily shared with other edge nodes 10. In other words local policy 78 may be defined specifically at an edge node at which it is stored.

Once the configuration manager 54 has acted on the one or more management operations (whether by applying them or not), the blockchain agent 52 may broadcast its state to other nodes of the blockchain network 110. For example, the blockchain agent 52 may generate and transmit a blockchain transaction that indicates the state of the edge node 10 (such as whether, how, and/or when the one or more management operations have been applied). The blockchain transaction may include information identifying the management operation was (or was not) performed. For example, the information identifying the management operation may be a block identifier (such as a block hash) that identifies the block from which the management operations was obtained. In this manner, the blockchain transaction indicating a node's state may record the management operation that was (or was not) applied.

For implementations in which management operations are targeted to an edge node 10 and encrypted using the targeted edge node 10's public key 72, the blockchain agent 52 may decrypt the management operations using the edge node 10's private key 74. In some implementations, the blockchain agent 52 may digitally sign a blockchain transaction from the management node 12 that includes the management operation. For instance, the management node 12 may generate a transaction directed to the edge node 10 and sign the transaction using the management node 12's public key.

The management node 12 may then write the signed transaction to the distributed ledger 42 to create an immutable record of the management operation and state change of the targeted edge node. In this manner, the transaction may be securely proven to have been executed by the edge node 10. It should be noted that the edge node 10 need not specifically be targeted in order to sign the transaction so as to create a record of the edge node's 10 state in a transaction and therefore block.

Upon receipt of a transaction, the edge node 10 apply the management operation and indicate that it has successfully done so by signing the transaction with the edge node's private key. The management node 12 may write this transaction into the distributed ledger 42, creating a secure, immutable record that proves that the edge node received and applied the management operation. In some implementations, an edge node 10 may be associated with a series of transactions such that each transaction may refer to a previous transaction hash. The transactions may be written to the distributed ledger 42 by the management node 12, creating an immutable and historic record of transactions for a given edge node 10.

In an implementation, the configuration manager 54 may periodically ensure compliance with the current state of the system. For instance, the smart contracts 44 may encode rules that specify what events trigger such checking. The events may include a restart, a new initialization, a passage of a period of time, a number of blocks written to the distributed ledger 42, a security event such as detection of malware, an input from a user specifying that the check should occur, and/or other event that can trigger compliance evaluation. To evaluate compliance, the configuration manager 54 may determine whether any current management operations (as defined by the latest block encoding such operations), including global ones and those specifically targeted to the edge node 10. If so, the configuration manager 54 may determine whether they should have been but were not implemented. If not, the configuration manager 54 may implement the management operations. In this manner, the edge nodes 10 may self-enforce the current management operations (as defined by the current system state).

The storage devices 70 may store an edge node's copy of the distributed ledger 42, the edge node's copy of smart contracts 44, the edge node's public key 72, the edge node's private key 74, and/or other data.

Figure 1C:
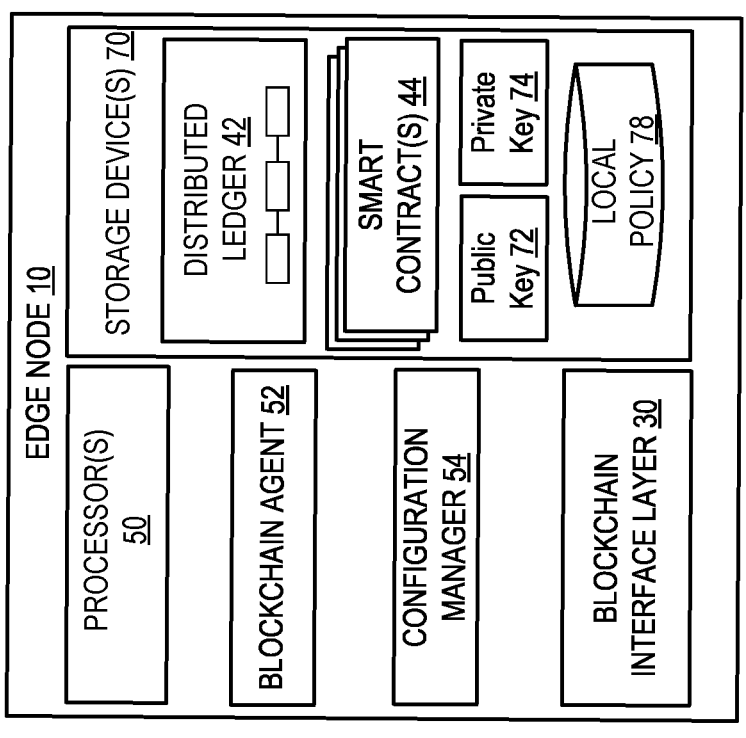
FIG. 1C illustrates an example of an edge node in a distributed blockchain network for decentralized management of device assets outside a computer network in accordance with an example of the disclosed technology.
Figure 1B:
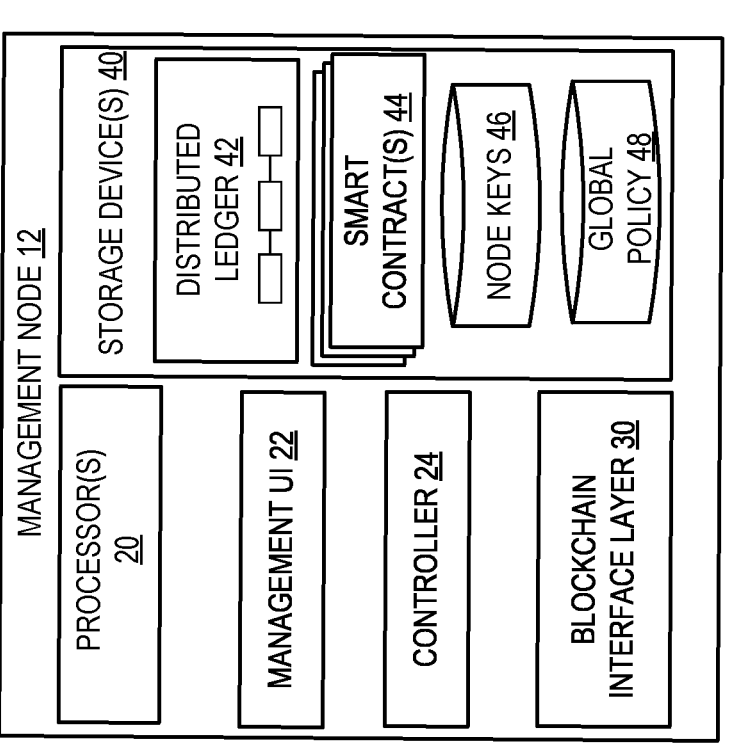
FIG. 1B illustrates an example of a management node in a distributed blockchain network for decentralized management of device assets outside a computer network in accordance with an example of the disclosed technology.
Figure 1D:
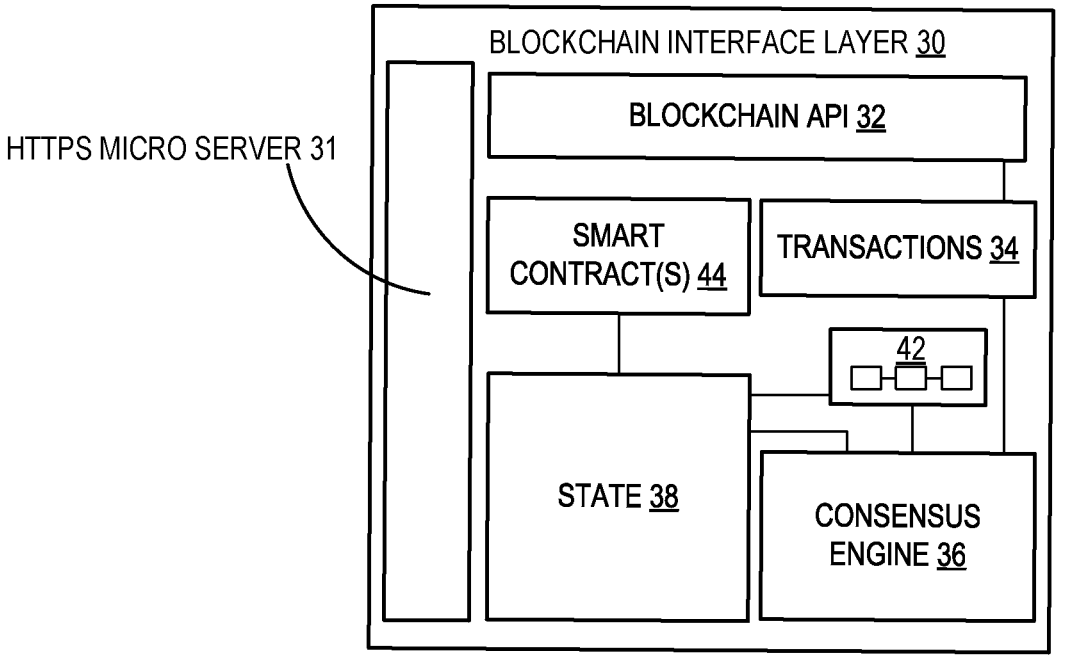
FIG. 1D illustrates an example of a blockchain interface layer for decentralized management of device assets outside a computer network in accordance with an example of the disclosed technology.

Reference will now be made to FIG. 1D, which illustrates an example of the blockchain interface layer 30. Each of the edge nodes 10 and the management node 12 may implement the blockchain interface layer 30, except that the edge nodes 10 may not have permission to write to the distributed ledger 42. The blockchain interface layer 30 may include a messaging interface used to communicate with the blockchain network 110. The messaging interface may be configured as a Secure Hypertext Transmission Protocol ("HTTPS") microserver 31. Other types of messaging interfaces may be used as well. The blockchain interface layer 30 may use a blockchain API 32 to make calls for blockchain functions based on a blockchain specification. Examples of blockchain functions include, but are not limited to, reading and writing blockchain transactions 34 and reading and writing blockchain blocks to the distributed ledger 42. One example of a blockchain specification is the Ethereum specification. Other blockchain specifications may be used as well. Consensus engine 36 may include functions that make consensus decisions, such as whether to enroll a node to participate in decentralized management of the edge nodes. The state of a node 10 can be reflected by state 38.

Although illustrated in FIGS. 1B and 1C as a single component, a management node 12 or edge node 10, respectively, may include a plurality of individual components (such as computer devices) each programmed with at least some of the functions described herein. The one or more processors 20 or 50 may each include one or more physical processors that are programmed by computer program instructions. The various instructions described herein are provided for illustrative purposes. Other configurations and numbers of instructions may be used, so long as the processor(s) 20 or 50 are programmed to perform the functions described herein.

Furthermore, it should be appreciated that although the various functions are illustrated in FIGS. 1B and 1C as being co-located within a single processing unit, in implementations in which processor(s) 20 or 50 includes multiple processing units, one or more instructions may be executed remotely from the other instructions.

The various instructions for performing various functions described herein may be stored in a storage device 40 or 70, which may comprise random access memory (RAM), read only memory (ROM), and/or other memory. Storage device 40 or 70 may store the computer program instructions (such as the aforementioned instructions) to be executed by processor 20 or 50, respectively, as well as data that may be manipulated by processor 20 or 50. Storage device 40 or 70 may comprise one or more non-transitory machine-readable storage media such as floppy disks, hard disks, optical disks, tapes, or other physical storage media for storing computer-executable instructions and/or data.

The distributed ledger 42, transaction queue, smart contracts 44, management operations to be performed, and/or other information described herein may be stored in various storage devices such as storage device 40 or 70. Other storage may be used as well, depending on the particular storage and retrieval requirements. For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The edge nodes 10 and management node 12 illustrated in FIGS. 1C and 1B, respectively, may be coupled to other nodes via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1A, as well as in other figures, different numbers of entities than those depicted may be used. Furthermore, according to various implementations, the components described herein may be implemented in hardware and/or software that configure hardware.

Swarm learning can involve various stages or phases of operation including, but not limited to: initialization and onboarding; installation and configuration; and integration and training. Initialization and onboarding can refer to a process (that can be an offline process) that involves multiple entities interested in swarm-based ML to come together and formulate the operational and legal requirements of the decentralized system. This includes aspects such as data (parameter) sharing agreements, arrangements to ensure node visibility across organizational boundaries of the entities, and a consensus on the expected outcomes from the model training process. Values of configurable parameters provided by a swarm learning network, such as the peer-discovery nodes supplied during boot up and the synchronization frequency among nodes, are also finalized at this stage. Finally, the common (global) algorithm to be trained can be agreed upon.

Once the initialization and onboarding phase is complete, participants (edge nodes 10, for example) may download and install a swarm learning platform/application onto their respective machines, i.e., nodes. The swarm learning platform may then boot up, and each node's connection to the swarm learning/swarm-based blockchain network can be initiated. As used herein, the term swarm learning platform can refer to a blockchain overlay on an underlying network of connections between nodes. The boot up process can be an ordered process in which the set of nodes designated as peer-discovery nodes (during the initialization phase) are booted up first, followed by the rest of the nodes in the swarm learning network.

With regard to the integration and training phase, the swarm learning platform can provide a set of APIs that enable fast integration with multiple frameworks. These APIs can be incorporated into an existing code base for the swarm learning platform to quickly transform a stand-alone ML node into a swarm learning participant. It should be understood that participant and node may be used interchangeably in describing various examples.

As discussed above, examples of the disclosed technology leverage hyperparameter tuning or optimization during the local training phase. As is the case with learned model parameters, optimum hyperparameters can be determined during localized training of a common ML algorithm at each of the nodes of a swarm learning network. The hyperparameters associated with each of the nodes can be shared with a leader node, merged by the leader node, and shared or distributed amongst the nodes, where the merged ML algorithm (including merged model parameters and merged hyperparameters) can undergo training again.

Hyperparameter tuning can be performed in accordance with various techniques that sample possible model architectures/structures vis-à-vis hyperparameter values from some range or set/space of hyperparameter values. This sampling can thought of as "searching" the hyperparameter space for optimum values. Hyperparameters are optimized or tuned by the training itself. That is, data is run through an ML algorithm's operations, and the resulting predictions can be compared with actual values for each data instance. The accuracy of the resulting prediction can be evaluated, and adjusted until the best hyperparameter values are found, i.e., those values that correspond to the best data fit. Examples of hyperparameter tuning methods include, for example, performing a grid search, where ML models are generated for each possible combination of any/all provided hyperparameter values, and the ML model architecture with the best results/most accurate predictions are selected. Performing a random search is another method of hyperparameter tuning, whereby a statistical probability distribution is provided for each hyperparameter, from which values may be randomly sampled. However, examples of the disclosed technology are not limited to any particular form or type of hyperparameter tuning. Other mechanisms for hyperparameter tuning can be used, e.g., Bayesian optimization.

Figure 2:
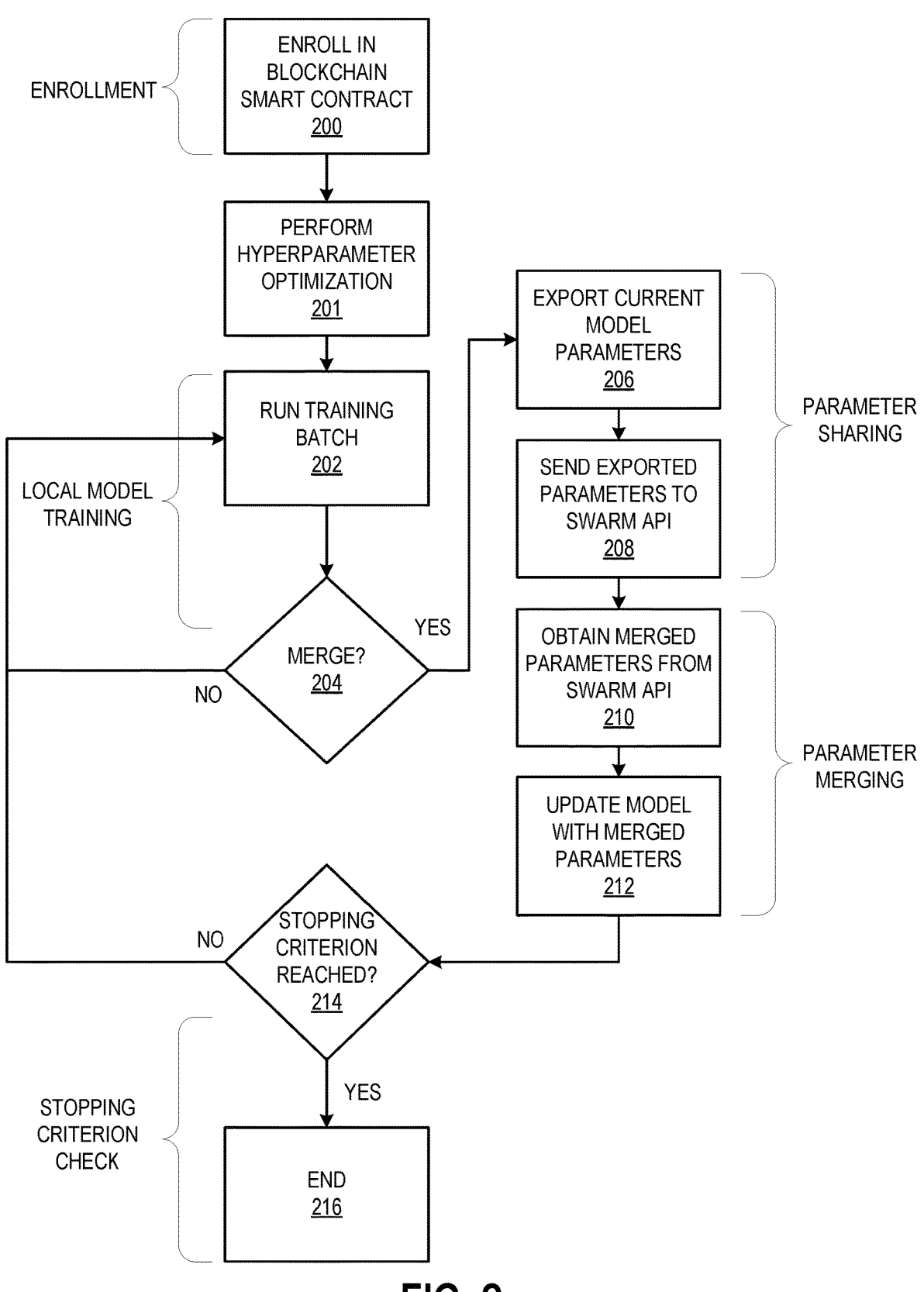
FIG. 2 is a flow chart illustrating operational aspects of a swarm learning system using hyperparameter tuning in accordance with an example of the disclosed technology.

At a high level, model training in accordance with various examples may be described in terms of enrollment, local model training, parameter sharing, parameter merging, and stopping criterion check. FIG. 2 illustrates operations that can be performed by the swarm learning platform in accordance with one example.

At 200, enrollment occurs. That is, each node in the swarm learning network may enroll or register itself in a swarm learning contract. In one example, this can be a one-time process. In other examples, enrollment or registration may be performed after some time as a type of verification process. Each node can subsequently record its relevant attributes in the swarm learning contract, e.g., the uniform resource locator (URL) from which its own set of trained parameters can be downloaded by other nodes.

At 201, hyperparameter optimization is performed. As noted above, hyperparameter optimization can be embodied as a variety of optimization techniques, e.g., grid or random searching, Bayesian optimization, etc. Hyperparameter optimization is performed to determine an optimum value(s) for the hyperparameter(s) of an ML algorithm. As also alluded to above, hyperparameter optimization is performed during training. In particular, hyperparameters may be selected for use at each node and training can be performed according to those hyperparameters. As described above, hyperparameter tuning/optimization can be performed by running multiple training iterations/epochs in a single training job, each iteration being a complete execution of training the local instance of the ML algorithm. Using an optimization technique(s) (e.g., Bayesian optimization, random/grid searching, or manual searching), the optimal hyperparameter can be determined. Those local node-specific hyperparameters, once their respective optimal hyperparameters are determined/identified, can be shared with a leader node as discussed herein. The leader node can merge the hyperparameters received from the various nodes, and a common/global hyperparameter/set of hyperparameters can be shared with the other nodes, and the common/global ML algorithm can be retrained at each of the other nodes (and the leader node) using merged model parameters and the optimized hyperparameter(s).

At 202, a first instance of local training occurs, where each node proceeds to train a local copy of the global or common algorithm in an iterative fashion over multiple rounds that can be referred to as epochs. During each epoch, each node trains its local ML algorithm using one or more data batches for some given number of iterations. A check to determine if model parameters can be merged may be performed at 204. It should be noted that in the case of hyperparameters, merging need only be performed once, while model parameter merging can occur more than once. The check can determine if the threshold number of iterations has been reached and/or whether a threshold number of nodes are ready to share their respective parameters. These thresholds can be specified during the initialization phase. After the threshold number of iterations has been reached, the parameter values of each node are exported to a file, which can then be uploaded to a shared file system for other nodes to access. Each node may signal the other nodes that it is ready to share its parameters. It should be understood that sharing in this context can refer to a node transmitting its parameters (model or hyperparameters), e.g., to a leader node.

Once parameter sharing commences, current model parameters and may be exported at 206 and the exported parameters can be sent to a swarm learning application programming interface (API) (described in greater detail below) at 208. The parameter sharing phase can begin with the election of a merge or epoch leader, whose role is to merge the parameters derived after local training on the common ML algorithm at each of the nodes. This election of a merge or epoch leader can occur after each epoch. While it is possible to elect a node to act as the merge leader across multiple epochs, electing a merge leader after each epoch helps ensure privacy by changing which node has the public key. Upon selection of one of the nodes of the swarm learning network to be the merge leader, the URL information of each participant or node can be used to download the parameter files from each node. In one example, a star topology can be used, where a single merge leader performs the merge. Other topologies, such as a k-way merge, where the merge is carried out by a set of nodes may also be used.

The merge leader may then merge the downloaded parameter files (from each swarm learning network node). Appropriate merge mechanisms or algorithms may be used, e.g., one or more of mean merging, weighted mean merging, median merging, etc. The merge leader may combine the parameter values from the nodes to create a new file with the merged parameters, and signals to the other nodes that a new file is available. It should be understood that the merged parameters include both merged model parameters and merged hyperparameters, separately. That is, the hyperparameters from the nodes can be merged with one another, and the model parameters from the nodes can be merged with one another. Model parameters are not merged with hyperparameters. At 210, each node may obtain the merged parameters (represented in the new file) from the merge leader via the swarm API. At 212, each node may update its local version of the common model with the merged parameters.

At 214, a check can be performed to determine if a stopping criterion has been reached. That is, each of the nodes evaluate the model with the updated parameter values using their local data to calculate various validation metrics. The values obtained from this operation are shared using a smart contract state variable. As each node completes this step, it signals to the swarm learning network that the update and validation step is complete. In the interim, the merge leader may keep checking for an update complete signal from each node. When it discovers that the merge participants have signaled completion, the merge leader merges the local validation metric numbers to calculate global metric numbers. This updating of the model can be thought of as a synchronization step. If the policy decided during initialization supports monetization during model building, the rewards corresponding to the contributions by each of the participants are calculated and dispensed at this point. Afterwards, the current state of the swarm learning network is compared against a stopping criterion, and if it is found to be met, the swarm learning process ends. Otherwise, the steps of local model training, parameter sharing, parameter merging, and stopping criterion check are repeated until the criterion is fulfilled.

Figure 3:
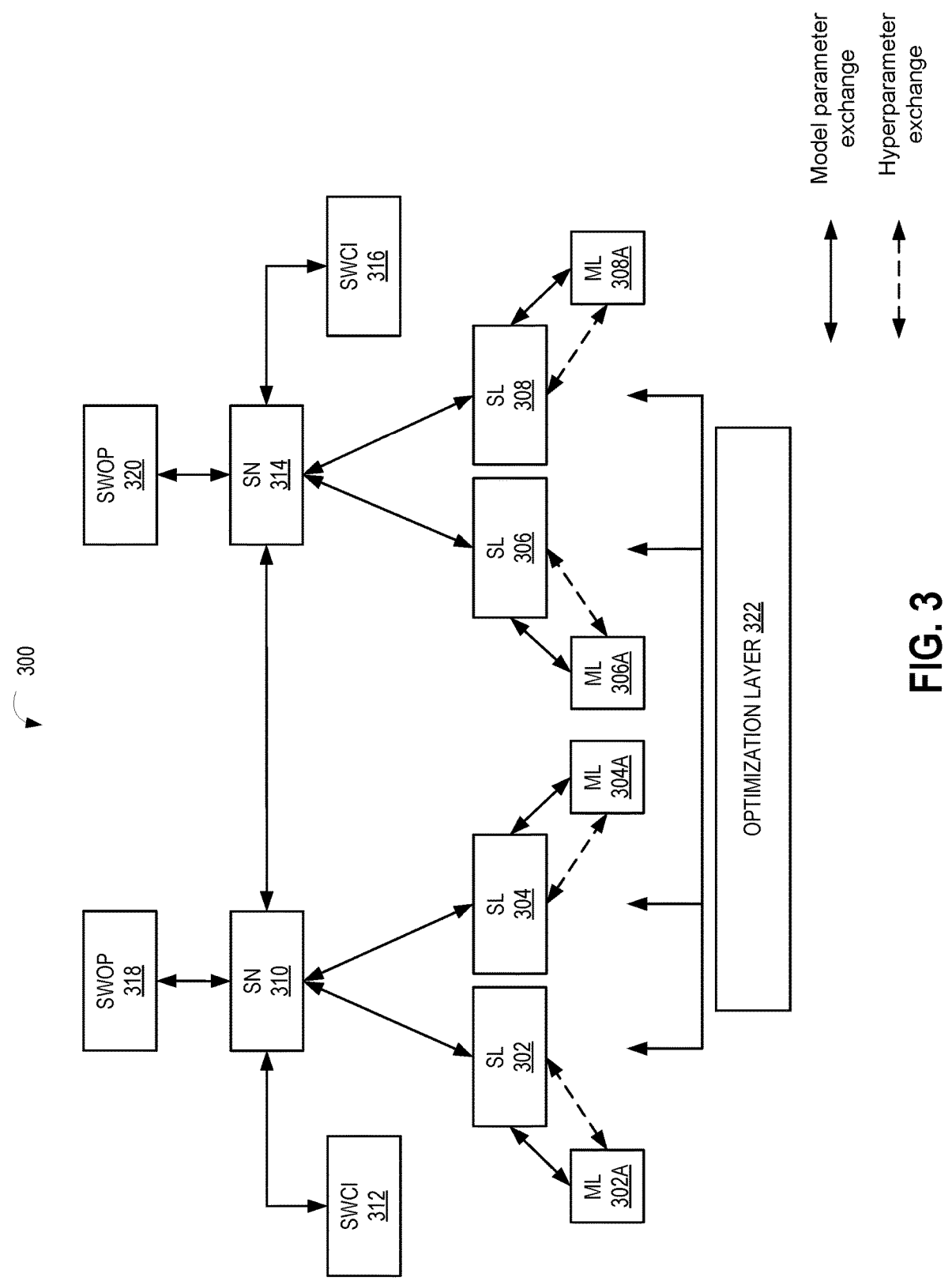
FIG. 3 illustrates an example swarm learning architecture using hyperparameter tuning in accordance with an example of the disclosed technology.

FIG. 3 illustrates an example swarm learning architecture 300 that can be made up components referred to as nodes, including, for example, ML nodes, swarm learning (SL) nodes, swarm network (SN) nodes, swarm learning command interface (SWCI) nodes, and swarm operator (SWOP) nodes. It should be understood that each of these nodes can be modularized and run in a separate container as a containerized function. Indeed, these "nodes" of swarm learning architecture 300 represent different swarm learning functionality, and not physical server nodes. Moreover, an optimization/tuning layer 322 (described in greater detail below) provide hyperparameter tuning at each local network node.

SL nodes 302, 304, 206, and 308 run the core of swarm learning architecture 300. An SL node works in collaboration with the other SL nodes in the network. It regularly shares its learnings with the other nodes and incorporates their insights. SL nodes 302, 304, 206, and 308 act as an interface between the user model application and other swarm learning components. SL nodes 302, 304, 206, and 308 may attend to distributing and merging parameters/ weights in a secure manner. That is, SL nodes 302, 304, 306, and 308 may together, form a data layer for controlling the reliable and secure sharing of model parameters and hyperparameters across the swarm learning network. SL nodes 302, 304, 206, and 308 are able to support different filesharing mechanisms, such as hypertext transfer protocol secure (HTTPS) over transport layer security (TLS), interplanetary file system (IPFS), and so on.

ML nodes 302A, 304A, 306A, and 308A (each of which correspond to their respective SL nodes 302, 304, 306, and 308), are responsible for algorithm training, and iteratively updating a model. That is, ML nodes 302A, 304A, 306A, and 308A may each include local ML algorithms, which may be maintained and trained at nodes making up the swarm learning network, e.g., edge nodes running SN nodes 310 and 314, described above, and that make up a blockchain network. As alluded to previously, for each ML node, there is a corresponding SL node in the swarm learning architecture 300. The corresponding SL nodes (302, 304, 306, and 308), perform the swarm training. Each pair of ML and SL nodes runs on the same host. This process continues until the SL nodes train an algorithm, in this case, a common ML algorithm to a desired state. It should be understood that the sharing/exchanging of model parameters may occur more frequently that the sharing/exchanging of hyperparameters inasmuch as hyperparameter tuning is accomplished by running training iterations, until an optimum hyperparameter for the given training is determined. After an optimum hyperparameter is determined, no other optimization need be performed, and the optimum hyperparameter for each node can be sent to the leader node, merged by the leader node, and shared by leader node for subsequent training at each node (which in this architecture, can refer to SL nodes 302-308) using the optimum hyperparameter.

In the illustrated example, each SL node may be operatively connected to an SN node, e.g., SL nodes 302 and 304 may be connected to SN node 310, while SL nodes 306 and 308 are connected to SN node 314. SN nodes form the blockchain or underlying secure/distributed ledger network. Swarm learning architecture may utilize various blockchain (or similar) technology, and in one example, may use Ethereum as the underlying blockchain platform. SN nodes 310 and 314 interact with each other using this blockchain platform to maintain and track progress. SN nodes 310 and 314 use this state and progress information to coordinate the working of the other swarm learning components/functions.

SWCI nodes, such as SWCI nodes 312 (connected to SN node 310), and 316 (connected to SN node 314) are the command interface tool for swarm learning architecture 300. In some embodiments, SWCI nodes 312 and 316 can be used to monitor the swarm learning architecture 300. SWCI nodes 312 and 316 can connect to any of the SN nodes 302, 304, 306, and 308 to manage swarm learning architecture 300.

SWOP nodes 318 and 320 can refer to agents that can manage swarm learning operations. SWOP nodes 318 and 320 are responsible for executing tasks that are assigned to it. A SWOP node may execute one task at a time. SWOP nodes aid in executing tasks such as starting and stopping swarm runs, building and upgrading ML containers, and sharing algorithms for training. Each SWOP node 318 and 320 are connected to SN 310 and 314, respectively. SWOP nodes 318 and 320 (or other SWOP nodes, to the extent such SWOP nodes exist) may effectuate a control layer implemented using the aforementioned blockchain technology. The control layer (SWOP nodes 318 and 320) ensures that all operations and the corresponding state transitions are performed in an atomic manner. Both state and supported operations are encapsulated in a blockchain smart contract, where the state comprises information such as the current epoch, the current members or participants of the swarm learning network, along with their IP addresses and ports, and the URIs for parameter files. The set of supported operations includes logic to elect a merge leader of the swarm learning network toward the end of each epoch, fault-tolerance, and self-healing mechanisms, along with signaling among nodes for commencement and completion of various phases.

It should be understood that, as contemplated herein, swarm learning, in one example, can be implemented as an API library available for multiple popular frameworks such as TensorFlow, Keras, and the like. These APIs provide an interface that is similar to the training APIs in the native framework familiar to data scientists. Calling these APIs automatically inserts the required "hooks" for swarm learning so that nodes seamlessly exchange parameters at the end of each model training epoch, and subsequently continue the training after resetting the local algorithms to the globally merged parameters.

Optimization layer 322, as described above, corresponds to the hyperparameter optimization functionality performed during localized training of the common ML algorithm. Optimization layer 322 may comprise software implemented at, and running at each of SL nodes 302-308. As also noted above, optimization layer 322 may use any one of a variety of hyperparameter tuning methods, such as performing random searches or grid searches to determine an hyperparameter to be fed to the common ML model based on a provided (local) dataset. That is, the optimum hyperparameter for a particular network node training dataset can be determined and shared with the leader node, which in turn will merge the hyperparameters (e.g., find the median, max, etc. of the received hyperparameters). It should be noted that some hyperparameters, e.g., in the case of neural network hyperparameter optimization, may not be merged or aggregated "directly," in which case optimization layer 322 may implement logic to allow for "indirect" merging or aggregation, e.g., using/passing a counter function instead of/representative of actual values. Once an optimum hyperparameter(s) is determined, that optimized hyperparameter(s) can be shared with the local network nodes, and the current instance of the common ML algorithm can be re-trained at each of the local network nodes with the local training datasets using the optimized hyperparameter(s).

In view of the above, a node can perform various operations in accordance with various examples, as described below and illustrated in FIG. 4.

FIG. 4 is an example computing component 400 that may be used to implement various features of a contributing node in a swarm learning network in accordance with one example of the disclosed technology. Computing component 400 may be, for example, a computer, a controller, or any other similar computing component capable of processing data. In the example implementation of FIG. 4, the computing component 400 includes a hardware processor 402, and machine-readable storage medium 404. In some examples, computing component 400 may be an example of processor 50 of edge node 10 (FIG. 1C) that trains a model, e.g., ML model 222A of FIG. 2B, or a processor operating in/as an SL node, such as SL node 302 of FIG. 3.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as instructions 406-414, to control processes or operations for monetizing data contributed to ML model training in a swarm learning network. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EE-PROM), a storage device, an optical disc, and the like. In some examples, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-414.

Hardware processor 402 may execute instruction 406 to receive model parameters from training local instances of a common ML algorithm. As noted above, federated learning comprises localized training that results in local model parameters being determined/identified pursuant to such localized training. The localized training can involve executing training iterations or epochs based on datasets local to each of the nodes. These model parameters can be shared with a leader node to be merged by the leader node, and later shared with other nodes. Again, model parameters can include weights and biases that comprise learnable parameters of an ML algorithm or model.

Hardware processor 402 may execute instruction 408 to receive optimized hyperparameters associated with the local instances of the common ML algorithm. Like the model parameters, hyperparameters are part of an ML model or algorithm, but unlike model parameters that are variables a chosen ML technique uses to adjust data, hyperparameters are variables regarding/that govern the training process itself. As described herein, hyperparameters can be optimized by running training iterations and using optimization or tuning techniques, such as random or grid searching, or manual or Bayesian optimization, to determine an optimum hyperparameter(s) for use with a particular ML algorithm or model, given a particular set of training data. Once the optimal hyperparameter(s) for a local node (executing a common ML algorithm for training) is determined, that optimal hyperparameter(s) can be sent to the aforementioned leader node to be merged with other determined optimal hyperparameters from other local nodes (each executing the common ML algorithm and training it on their respective, local data).

Hardware processor 402 may execute instruction 410 to merge the model parameters and to merge the optimized hyperparameters. As described above, one or more merge mechanisms or algorithms are contemplated for use in accordance with examples of the disclosed technology. Examples of merge mechanisms/algorithms can include, but are not limited to weighted mean merging, median merging, etc. The leader mode may combine the model parameter values from the nodes to create a new file with the merged model parameters. Similarly, the leader node may also merge the optimized hyperparameters vis-à-vis determining a mean, median, or maximum value associated with the hyperparameters. As described above, nodes may perform hyperparameter optimization and may then share their respective, optimized hyperparameters with the leader node. It should be noted that this sharing and merging of optimized hyperparameters need only occur once. That is, the optimized hyperparameters may be determined at each node during the training of the common ML algorithm instances at each of the nodes.

Hardware processor 402 may execute instruction 412 to generate an updated version of the common ML algorithm based on the merged model parameters, and the merged optimized hyperparameters. That is, once determined and shared with the leader node, the merged hyperparameters (along with the merged model parameters that eventually result in an updated/new version of the common ML algorithm) can be shared with the nodes, and re-training of the latest version of the common ML algorithm at each of the nodes can be performed using the merged optimized hyperparameters. In particular, the nodes will perform re-training using, e.g., every combination of the merged optimized hyperparameters. The accuracy of the common ML algorithm can be assessed relative to each of the combinations of the merged optimized hyperparameters, and the best/optimal/preferred combination of optimized hyperparameters can be selected to be used in the common ML model. It should be understood that more than one hyperparameter may be optimized-hence the aforementioned re-training using different combinations of optimized hyperparameters. The result is a set of re-trained ML algorithms from each of the nodes of the swarm learning network, which can result in the sharing of the latest model parameters with the leader node that can be used to generate a "final" common or global ML model that can be shared with the nodes, and operationalized.

Hardware processor 402 may further execute instruction 414 to, as alluded to above, generate a common ML model pursuant to re-training instances of the new version of the common ML algorithm. Again, the re-training of the common ML algorithms at each of the nodes allows for additional training using the merged hyperparameters and merged model parameters to achieve an optimal or preferred common ML model.

Figure 5:
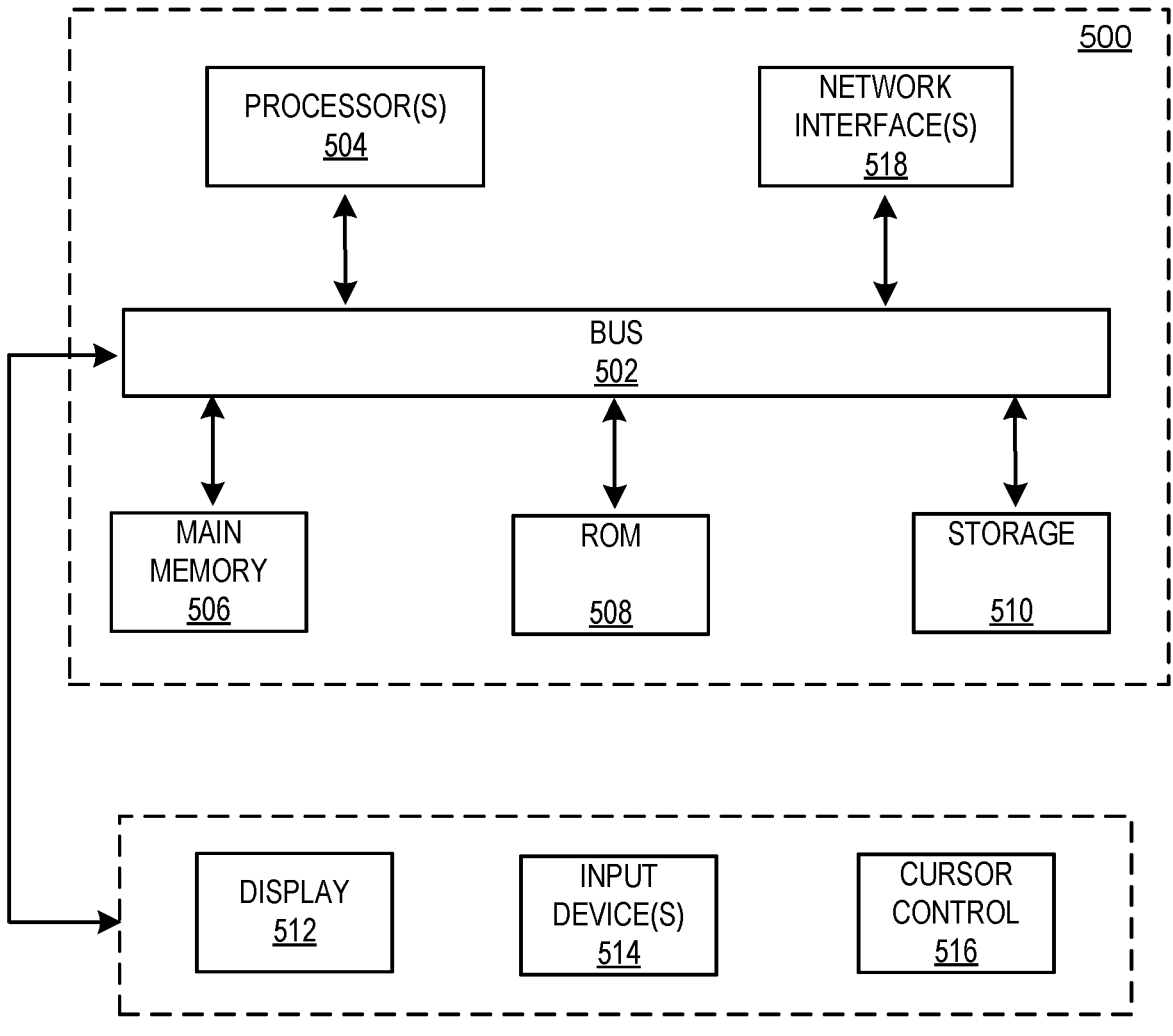
FIG. 5 is an example computing component that may be used to implement various features of examples of the present disclosure.

FIG. 5 depicts a block diagram of an example computer system 500 in which various examples described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some examples, the same direction information and command selections as cursor control may be implemented via receiving touches on a touch screen without a cursor.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Non-transitory media is distinct from but may be used in conjunction with transmission media. Transmission media participates in transferring information between non-transitory media.

The computer system 500 may implement the techniques described herein using customized hard-wired logic, one or more ASICs or FPGAs, firmware and/or program logic which in combination with the computer system causes or programs computer system 500 to be a special-purpose machine.

The computer system 500 also includes a communication interface 518 coupled to bus 502. Network interface 518 provides a two-way data communication coupling to one or more network links that are connected to one or more local networks. In any such implementation, network interface 518 sends and receives electrical, electromagnetic or optical signals that carry digital data streams representing various types of information.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS).

As used herein, a circuit or component might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:

receiving model parameters, the shared model parameters derived from training local instances of a common machine learning (ML) algorithm at network nodes of a distributed ML network;

receiving optimized hyperparameters associated with the local instances of the common ML algorithm, the optimized hyperparameters resulting from hyperparameter optimization operations performed at each of the network nodes in conjunction with their respective training of the local instances of the common ML algorithm;

merging the model parameters;

merging the optimized hyperparameters;

generating an updated version of the common ML algorithm based on the merged model parameters, and the merged optimized hyperparameters;

generating a common ML model pursuant to re-training instances of the updated version of the common ML algorithm at the network nodes.

2. The method of claim 1, wherein the training of the local instances of the common ML algorithm is performed with data local to each of the network nodes.

3. The method of claim 1, further comprising, electing a leader node of the network nodes.

4. The method of claim 3, wherein the leader node receives the model parameters, and the optimized hyperparameters, and wherein the leader node performs the merging of the model parameters, the merging of the optimized hyperparameters, the generating of the new version of the common ML algorithm, and the generating of the common ML model.

5. The method of claim 1, wherein the received model parameters comprise at least one of learnable weights and biases used in the common ML algorithm during the training of the local instances of the common ML algorithm.

6. The method of claim 1, wherein the optimized hyperparameters comprise one or more parameters defining at least one of the structure or operation of the common ML algorithm.

7. The method of claim 1, wherein the merging of the optimized hyperparameters comprises one of determining a mean value, a median value, or a maximum value representative of the shared optimized hyperparameters.

8. The method of claim 1, wherein the receiving of the model parameters and the merging of the model parameters occurs multiple times during the training of the local instances of the common ML algorithm.

9. The method of claim 8, wherein the receiving of the optimized hyperparameters and the merging of the optimized hyperparameters occurs once during the training of the local instances of the common ML algorithm.

10. The method of claim 1, wherein the re-training of the instances of the new version of the common ML algorithm at the network nodes comprises re-training the instances in accordance with different combinations of the merged optimized hyperparameters.

* * * * *